US012130888B2

(12) United States Patent
Rhodes et al.

(10) Patent No.: US 12,130,888 B2
(45) Date of Patent: Oct. 29, 2024

(54) FEATURE EXTRACTION, LABELLING, AND OBJECT FEATURE MAP

(71) Applicant: Raytheon Company, Tewksbury, MA (US)

(72) Inventors: Crystal D. Rhodes, Richardson, TX (US); John R. Goulding, Farmersville, TX (US); Christopher M. Pilcher, Richardson, TX (US); Christopher R. Harris, Plano, TX (US)

(73) Assignee: Raytheon Company, Tewksbury, MA (US)

( * ) Notice: Subject to any disclaimer, the term of this patent is extended or adjusted under 35 U.S.C. 154(b) by 304 days.

(21) Appl. No.: 17/520,000

(22) Filed: Nov. 5, 2021

(65) Prior Publication Data
US 2023/0143374 A1 May 11, 2023

(51) Int. Cl.
*G06F 18/214* (2023.01)
*G06F 18/213* (2023.01)
(Continued)

(52) U.S. Cl.
CPC .......... *G06F 18/214* (2023.01); *G06F 18/213* (2023.01); *G06F 18/24* (2023.01);
(Continued)

(58) Field of Classification Search
CPC ...... G06F 18/214; G06F 18/213; G06F 18/24; G06N 20/00; G06N 3/0464; G06N 3/096;
(Continued)

(56) References Cited

U.S. PATENT DOCUMENTS 10,823,841 B1\* 11/2020 Lien ................... G01S 13/88
2019/0294925 A1\* 9/2019 Kang .................. G06N 3/045

FOREIGN PATENT DOCUMENTS

| CN | 110168573 | 8/2019 | |
|---|---|---|---|
| JP | 2018537798 | 12/2018 | |
| WO | WO-2017092615 A1 \* | 6/2017 | ........... G06K 9/6221 |

OTHER PUBLICATIONS

Ma, M.; Chen, J.; Liu, W.; Yang, W. Ship Classification and Detection Based on CNN Using GF-3 Sar Images. Remote Sens. 2018, 10, 2043. https://doi.org/10.3390/rs 10122043 (Year: 2018).\*

(Continued)

*Primary Examiner* — Sumati Lefkowitz
*Assistant Examiner* — Aaron Joseph Sorrin
(74) *Attorney, Agent, or Firm* — Schwegman Lundberg & Woessner, P.A.

(57) ABSTRACT

Devices, systems, and methods for machine learning model generation. A method can include generating image chips of an image. The image chips can each provide a view of a different extent of an object in the image. Based on an object definition that indicates respective features of the object and a location of the respective features along a length of the object, it can be determined whether any of the image chips include any of the respective features. Each image chip of the image chips can be labeled to include an indication of any of the features included in the image chip resulting in labelled image chips. The method can include training an ensemble classifier based on the labelled image chips resulting in a trained ensemble classifier.

17 Claims, 12 Drawing Sheets

(51) Int. Cl.
   G06F 18/24    (2023.01)
   G06N 20/00    (2019.01)
   G06T 7/73     (2017.01)
   G06V 10/40    (2022.01)
(52) U.S. Cl.
   CPC .............. *G06N 20/00* (2019.01); *G06T 7/73* (2017.01); *G06V 10/40* (2022.01); *G06T 2207/20081* (2013.01)
(58) Field of Classification Search
   CPC .......... G06N 3/084; G06N 3/09; G06N 3/045; G06N 3/08; G06N 20/20; G06N 3/04; G06N 7/01; G06T 7/73; G06T 2207/20081; G06T 2207/10016; G06T 2207/10036; G06T 2207/10044; G06T 2207/10048; G06T 2207/20056; G06T 2207/20076; G06T 2207/20084; G06T 2207/30212; G06T 2207/10032; G06T 2207/30181; G06T 17/05; G06T 2207/10024; G06T 2207/20104; G06T 2207/20132; G06T 2207/30242; G06T 7/10; G06T 7/11; G06T 7/60; G06T 7/74; G06V 10/40; G06V 2201/07; G06V 20/17; G06V 10/811; G06V 10/82; G06V 20/13; G06V 10/454; G06V 10/72; G06V 10/7753
   See application file for complete search history.

(56) References Cited

OTHER PUBLICATIONS

M. Jiang, X. Yang, Z. Dong, S. Fang and J. Meng, "Ship Classification Based on Superstructure Scattering Features in SAR Images ," in IEEE Geoscience and Remote Sensing Letters, vol. 13, No. 5, pp. 616-620, May 2016, doi: 10.1109/LGRS.2016.2514482. (Year: 2016).*
An, Q.; Pan, Z.; You, H. Ship Detection in Gaofen-3 SAR Images Based on Sea Clutter Distribution Analysis and Deep Convolutional Neural Network. Sensors 2018, 18, 334. https://doi.org/10.3390/s18020334 (Year: 2018).*
WO-2017092615-A1—original and english translation (Year: 2017).*
S. Arivazhagan, W. S. Lilly Jebarani, R. Newlin Shebiah, S. V. Ligi, P. V. Hareesh Kumar and K. Anilkumar, "Significance based Ship Detection from SAR Imagery," 2019 1st International Conference on Innovations in Information and Communication Technology (ICIICT), Chennai, India, 2019, pp. 1-5 (Year: 2019).*
"Feature (computer vision)", wikipedia, [Online] Retrieved from the internet:https: en.wikipedia.org wiki Feature_detection_(computer_vision), 8 pgs.
"Object detection", Wikipedia, [Online] Retrieved from the internet:https: en.wikipedia.org wiki Object_detection, 4 pgs.
"Content-based image retrieval", wikipedia, [Online] Retrieved from the internet:https: en.wikipedia.org wiki Content-based_image_retrieval, 10 pgs.
"Overview of the YOLO Object Detection Algorithm", [Online]. Retrieved from the Internet: https: odsc.medium.com overview-of-the-yolo-object-detection-algorithm-7b52a745d3e0, (Sep. 25, 2018), 9 pgs.
"Ensemble learning", wikipedia, [Online] Retrieved from the internet:https: en.wikipedia.org wiki Ensemble_learning, 17 pgs.
"Object Detection With Deep Learning and Sliding Window", [Online]. Retrieved from the Internet: https: www. youtube.com watch?v=rUi7WbKVMig, 2 pgs.
"Satellite Image Classification with Deep Learning", IEEE Applied Imagery Pattern Recognition Workshop (AIPR), [Online] Retrieved from the internet:https: www.computer.org csdl proceedings-article aipr 2017 08457969 13x18A8WyWY, (2017), 7 pgs.
"Automate Data Labeling", [Online]. Retrieved from the Internet: https: docs.aws.amazon.com sagemaker latest dg sms-automated-labeling.html, 8 pgs.
"Mastering Data Labeling for ML in 2024 A Comprehensive Guide", [Online]. Retrieved from the Internet: https: www.cloudfactory.com data-labeling-guide, 24 pgs.
"Automatic Data Labeling Gains Momentum with New IBM and Labelbox Announcements", [Online]. Retrieved from the Internet: https: www.datanami.com 2020 02 11 automatic-data-labeling-gains-momentum-with-new-IBM-and-labelbox-announcements , (Feb. 11, 2020), 4 pgs.
Boyi, Hou, "Gradual Machine Learning for Entity Resolution", IEEE Transactions on Knowledge and Data Engineering, vol. 34, (Apr. 2022), 27 pgs.
Brownlee, Jason, "Ensemble Learning Methods for Deep Learning Neural Networks", [Online]. Retrieved from the Internet: https: machinelearningmastery.com ensemble-methods-for-deep-learning-neural-networks , (Aug. 6, 2019), 45 pgs.
Celik-Tinmaz, "Digital image processing using convolutional neural networks", [Online] Retrieved from the internet: https: patents.google.com patent AU2016201292B2 en?q=object+detection+cnn+ensembleandoq=object+detection +cnn+ensemble, 33 pgs.
Girshick, Ross, "Rich Feature Hierarchies for Accurate Object Detection and Semantic Segmentation", Proceedings of the 2014 IEEE Conference on Computer Vision and Pattern Recognition (CVPR), (2014), 8 pgs.
Hirata, Daiki, "Ensemble learning in CNN augmented with fully connected subnetworks", [Online] Retrieved from the internet:https: arxiv.org abs 2003.08562, (Mar. 25, 2020), 6 pgs.
Liu, Xiaofeng, "Organ Labeling Using Anatomical Model-Driven Global Optimization", Healthcare Informatics, Imaging and Systems Biology, IEEE International Conference on, [Online] Retrieved from the internet:https: www.computer.org csdl proceedings-article hisb 2011 4407a338 12OmNApcul0, (2011), 8 pgs.
Pokhrel, Sabina, "Image Data Labelling and Annotation Everything You Need To Know", [Online]. Retrieved from the Internet: https: towardsdatascience.com image-data-labelling-and-annotation-everything-you-need-to-know-86ede6c684b1, (Mar. 10, 2020), 19 pgs.
Reddy, Mohan, "Ground Truth Gold Intelligent Data Labeling and Annotation", [Online]. Retrieved from the Internet: https: medium.com hivedata ground-truth-gold-intelligent-data-labeling-and-annotation-632f63d9662f, (Mar. 20, 2018), 12 pgs.
Savelli, B, "A Multi Context CNN Ensemble for Small Lesion Detection", Artificial Intelligence in Medicine vol. 103, (Mar. 2020), 9 pgs.
Xiaojun, Zhou, "An Ensemble Learning Method Based on Deep Neural Network and Group Decision Making", Knowledge-Based Systems vol. 239, (Mar. 5, 2022), 8 pgs.
Yan, Tong, "Automatic facial landmark labeling with minimal supervision", IEEE Conference on Computer Vision and Pattern Recognition, [Online] Retrieved from the internet:https: www.computer.org csdl proceedings-article cvpr 2009 05206670 12OmNy4r3Yb, (2009), 8 pgs.
Yazdizadeh, Ali, "Ensemble Convolutional Neural Networks for Mode Inference in Smartphone Travel Survey", [Online] Retrieved from the internet:https: arxiv.org ftp arxiv papers 1904 1904.08933.pdf, 8 pgs.

* cited by examiner

FEATURE EXTRACTION, LABELLING, AND OBJECT FEATURE MAP

TECHNICAL FIELD

Embodiments discussed herein regard devices, systems, and methods for automated feature extraction and labelling and object feature map generation.

BACKGROUND

An automatic target recognizer (ATR) is a real-time or near-real-time image or signal processing system. An ATR typically receives an input stream of data and outputs a list of targets that it has detected and recognized from the input stream of data. An ATR system can perform other functions such as image stabilization, preprocessing, mosaicking, target tracking, activity recognition, multi-sensor fusion, common operating picture, sensor and platform control, and data organizing for transmission or display. ATR input data can be in the form of non-imaging one-dimensional (1D) sensor returns, such as ultra-high range-resolution (HRR) radar returns for air-to-air automatic target recognition or vibration signatures from a laser radar for recognition of ground targets. ATR data can have two-dimensional (2D) images that fall into three general views: perspective, plan, and profile. Typical 2D images for ATR are infrared and synthetic aperture radar (SAR) images. ATR input data can be three-dimensional (3D), such as those from sequences of multiple exposures taken over time from a non-stationary position. As a target moves, so do sensors, and that movement can be exploited by an ATR. Hyperspectral data, which are views of the same scene looking in different spectral bands, is another approach to obtaining multiple image data where the third dimension is wavelength.

The real world covers many factors of variation (FoV), drawn from the physics of sensed observations. For problems like discrimination, the state of the world relative to its FoV is estimated, for example but not limited to where something is (e.g., position in the world, range from the sensor, or the like), what something is (e.g., general class, specific object kind), kinematic state (e.g., velocity, acceleration, jerk, or the like), and pose (e.g., orientation with respect to the observation frame). Sensors observe the world, but couple across many of the FoV. The state is estimated using data from the one or more sensors, which observe across many more FoV than just the ones we are interested in, and compress/correlate across other FoV. When the statistics of some FoV of interest may be understood, the preferred method is to regress on the parameters of that model to solve the state. The covariation between the FoV and the sensed state of the world forms a manifold. Each sensor modality and characteristic may induce a different manifold, on the same underlying FoV. Non-linear projections reduce dimensionality, but mapping is key to learning a compact representation that generalizes well. Linear projections produce complex, high-dimensional manifolds that require exponentially many parameters. The process of covering the world state manifold can be a lot like splining. An unknown function is approximated with a parametric function whose parameters are fit via an error minimization process. The goal can be to find some parametric model which can estimate the statistics of the underlying problem effectively. Products of log linear models do a highly effective job of fitting a wide array of real-world distributions, as they are an intrinsic parametric form of discrete state systems. The log linear model, for example $$f(x) \sim e^{(\Sigma_i \theta_i \varphi_i(x))}$$

Where x is a vector which represents a configuration of the system (e.g., an image chip from a sensor), $\varphi_i(x)$ is a function of the values of the vector x, and $\theta_i$ is a parameter of the model. The Boltzmann Distribution from physics maps from phase space (FoV space) to observable space, and it may be used for sensor data to FoV space.

Modern ATR systems typically process data in four stages. The first stage is a selection of the sensors used to produce target measurements. The second stage involves preprocessing of the data and regions of interest within the data, which is referred to as segmentation. The third stage includes feature extraction and selection where the regions of interest of the data are characterized. The last stage involves processing of features for decision making (i.e., classification). Classification techniques can utilize artificial intelligence (AI), neural networks (NNs), Bayesian networks, fuzzy logic, normalized linear correlation, and feature sequencing to enhance classification, to name but a few.

While the use of AI, NNs, and deep learning (DL) have increased the accuracy and reliability of ATR systems, such processing is often so complex that it is impractical for human operators to understand how an ATR reached target decisions. For certain organizations, it can be critically important for operators to have the ability to understand and explain their rationale for taking actions associated with an ATR, including explaining how targets were identified by an ATR system under their control. Furthermore, the processing complexity associated with typical classification models and associated data sets often require a relatively long model training period which can be unacceptable in certain circumstances such as military engagements or missions. Also, the labelling of the data for training is prohibitively costly in terms of man hours.

DETAILED DESCRIPTION

The application, in various aspects, addresses deficiencies associated with conventional ATRs and machine learning (ML) based systems generally. The application includes example apparatuses, systems, and methods for an ATR system configured to realize target decisions that are more readily understandable and explainable while also reducing classifier model training time and increasing classification accuracy. In one implementation, an ATR system knows the characteristics or features of objects and automatically extract features from images based on the known characteristics or features. The ATR system can generate an object feature map based on the automatically extracted features. Object classification can be performed based on the object feature map.

Figure 1:
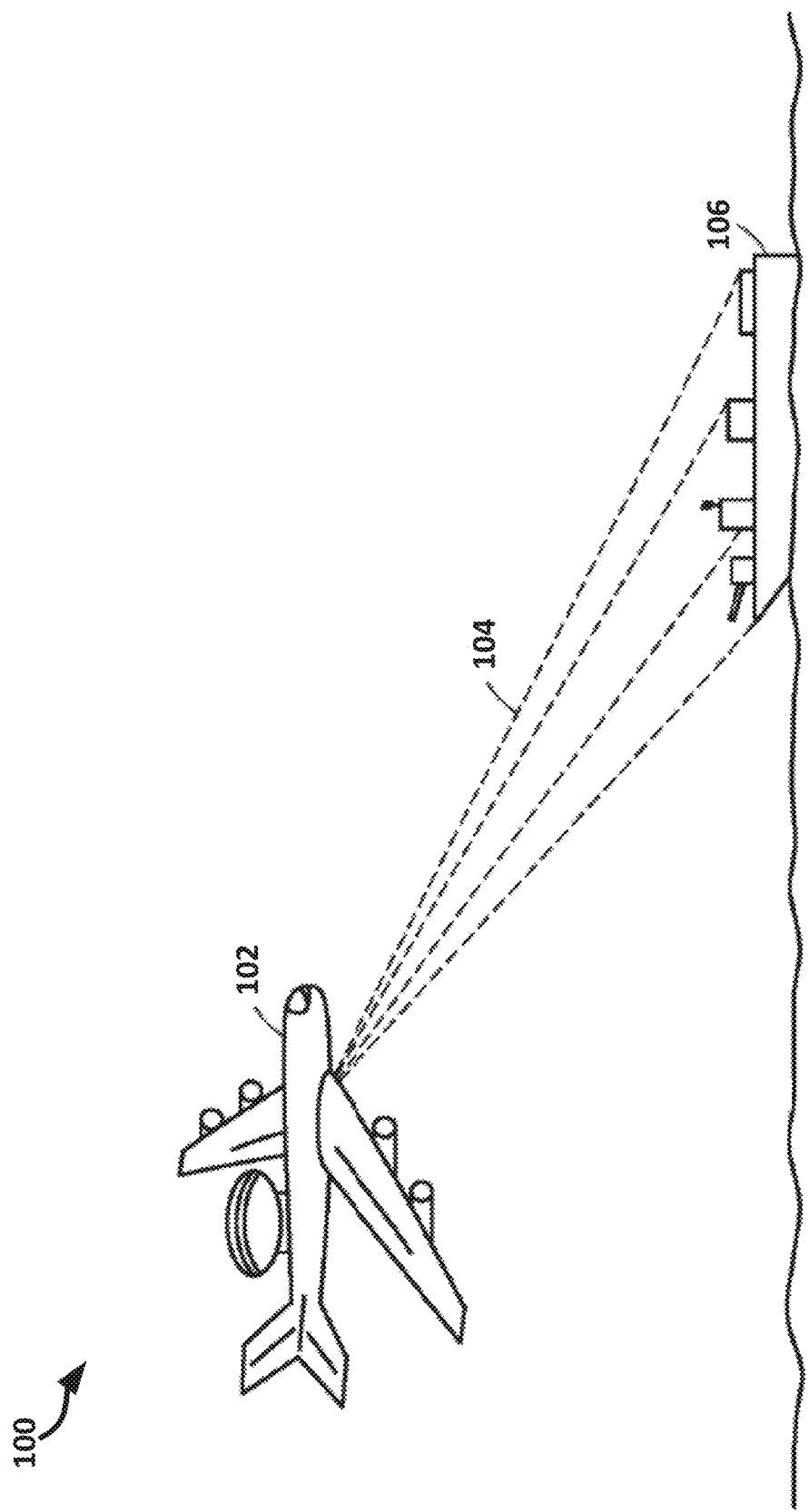
FIG. 1 illustrates, by way of example, a perspective view of an aircraft using a radar system to capture image data associated with a target naval vessel.

FIG. 1 is a view 100 of an aircraft 102 using a radar system to capture image data associated with a target naval vessel 106. The view 100 shows aircraft 102 emitting radar beams 104 from an antenna to illuminate the vessel 106, which enables aircraft 102 to capture radar pulses echoed back toward the aircraft 102 as it moves through the air. As the antenna location changes with respect to time, a radar system in aircraft 102, which may be a synthetic aperture radar (SAR) or inverse synthetic aperture radar (ISAR), combines recordings at multiple positions of the aircraft 102 and its antenna to form a synthetic antenna aperture. This allows the radar system to generate high-resolution images and/or data of the target vessel 106 using a relatively small antenna.

Aircraft 102 may have an ATR system that receives raw target data and/or target images from a radar system of aircraft 102. The aircraft 102 may have an image acquisition system that receives data from a radar receiver, processes the data into images, and provides the images of vessel 106 to the ATR. The aircraft 102 may send its raw or processed target and/or image data to other land, sea, or air entities. For example, aircraft 102 may be communicatively linked with other aircrafts, vessels, and facilities via, for example, an Aegis Combat System that enables aircraft 102 to transmit target data and/or images to a remote ATR system at another entity connected to the Aegis network. The aircraft 102 may also operate bi-statically to receive radar pulses from another aircraft or ground transmitter.

While FIG. 1 explains embodiments in terms of SAR or ISAR on an aircraft, embodiments are also applicable to LADAR, sound detection and ranging (SONAR), multi-spectral imaging, or the like. The images can be provided by a sensor (e.g., ISAR, SAR, LADAR, SONAR, electro-optical/infrared (EO/IR), or the like) on a platform (e.g., manned or unmanned aircraft, satellite, balloon, ship, ground vehicle, submarine, or the like).

Manually sifting through and labelling the object features in images is prohibitively costly. Many image classification systems operate more accurately and robustly with increased training and testing data, requiring significant human labor and expense. Traditionally, this manual labelling process is labor-intensive and monetarily costly. Some estimates indicate that labelling of training data and testing data consumes over twenty-five percent of an overall ML model development process. This labelling of training data and testing data typically involves humans manually labelling individual images. The process can be sped up using software, but still requires human input for labelling. The humans performing this process can make feature positions and labels subjective. This leads to inconsistency and inaccuracy in labelling. Also, some types of imagery, like ISAR imagery can be particularly difficult to label manually.

Another issue in gathering training data includes collecting data on rare targets such as enemy combatants. This type of data can be extremely costly to collect, and potentially dangerous to hardware and personnel. Sometimes it may be impossible to collect data on rare targets. It is important to be able to classify rare target types despite the sparse availability of such data.

Figure 2:
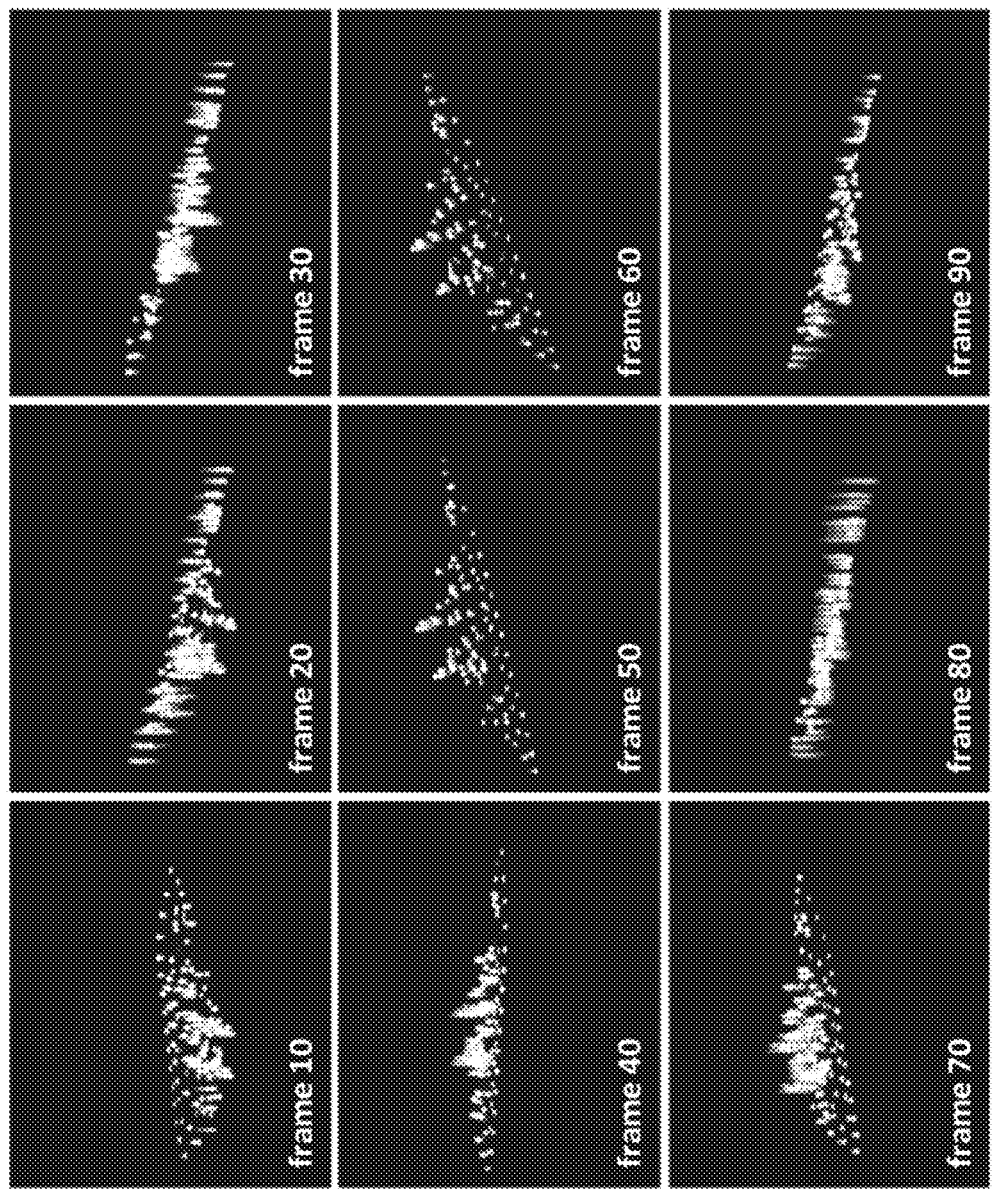
FIG. 2 illustrates, by way of example, a time sequence of ISAR images of a same object.

FIG. 2 illustrates, by way of example, a time sequence of ISAR images 200 of a same object. The images include range along the x-axis and Doppler along the y-axis. ISAR uses six degrees of freedom (DoF) motion of the target to form range/Doppler imagery. The six DoF include roll, pitch, yaw, heave, sway, and surge. Periodic target motion causes ISAR image utility (in terms of usefulness for ML models and human analysts) to vary. For example, for a ship in an environment of sea state 3, a motion period is on the order of 9 seconds and for sea state 0, the motion period is on the order of 90 seconds. The ISAR images 200 are for a ship in sea state 0. As can be seen, some of the images provide detail sufficient for a human identifying parts of the ship (e.g., frames 40, 50, 60, and 70), while other of the images provide insufficient detail for a human identifying parts of the ship (e.g., frames 30 and 80). This means that only some of the ISAR images generated in this motion period could be labelled manually by a human to be used for ML classification while others could not be labelled manually. For example, frames 30 and 80 of the images 200 can be particularly difficult for a human to label.

Figure 3:
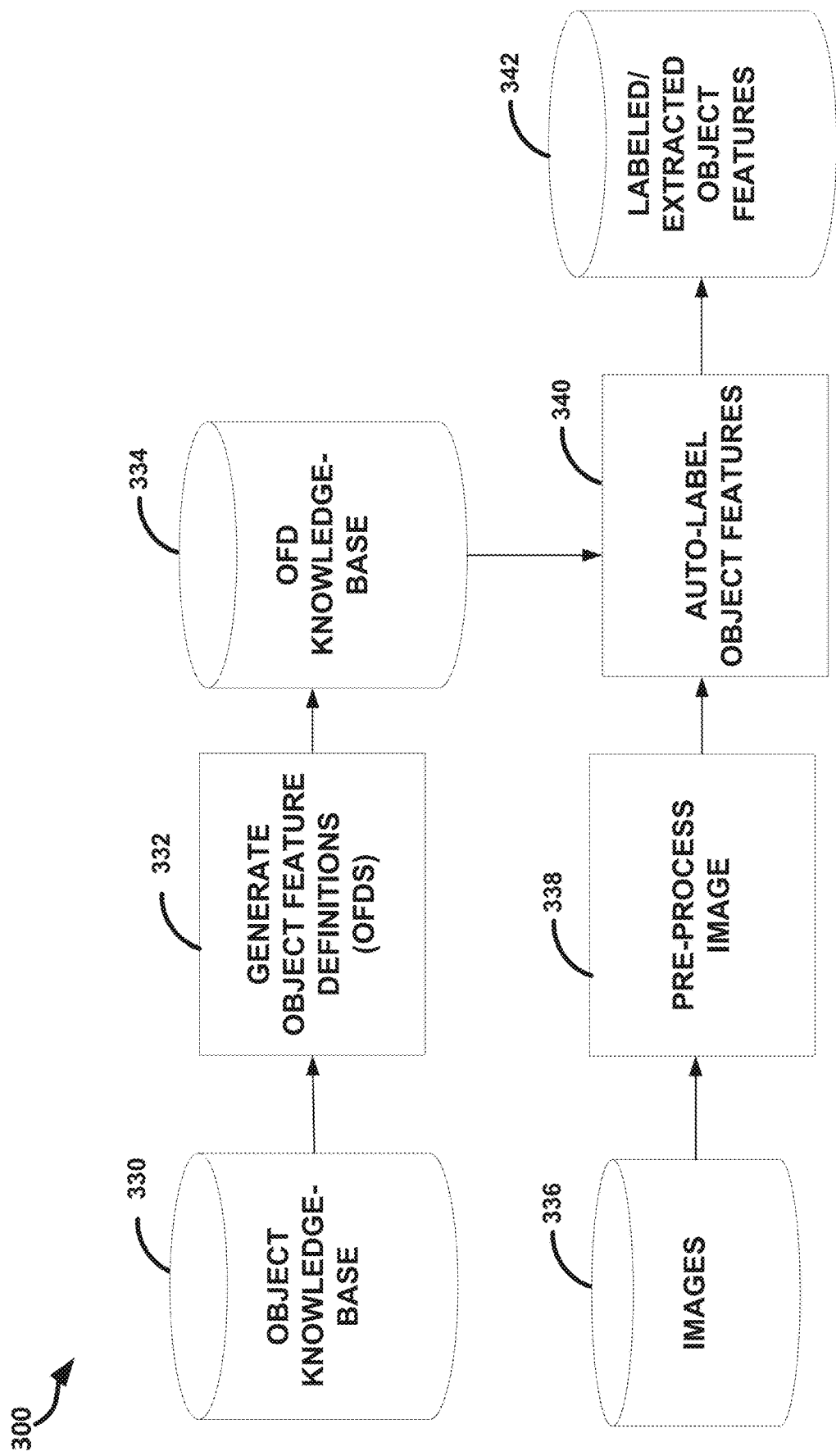
FIG. 3 illustrates, by way of example, a block diagram of an embodiment of a system for automatic feature extraction and labeling.

FIG. 3 illustrates, by way of example, a block diagram of an embodiment of a system 300 for automatic feature extraction and labeling. The system 300 includes repositories of data defining objects to be classified including an object knowledge-base 330, and an object feature definition (OFD) knowledge-base 334. These data can include a computer-aided drafting (CAD) model, photograph, drawing, outline, wire diagram, or the like. The OFD is applied to automatically extract and label features from images 336 to generate labeled/extracted object features 342.

Figure 4:
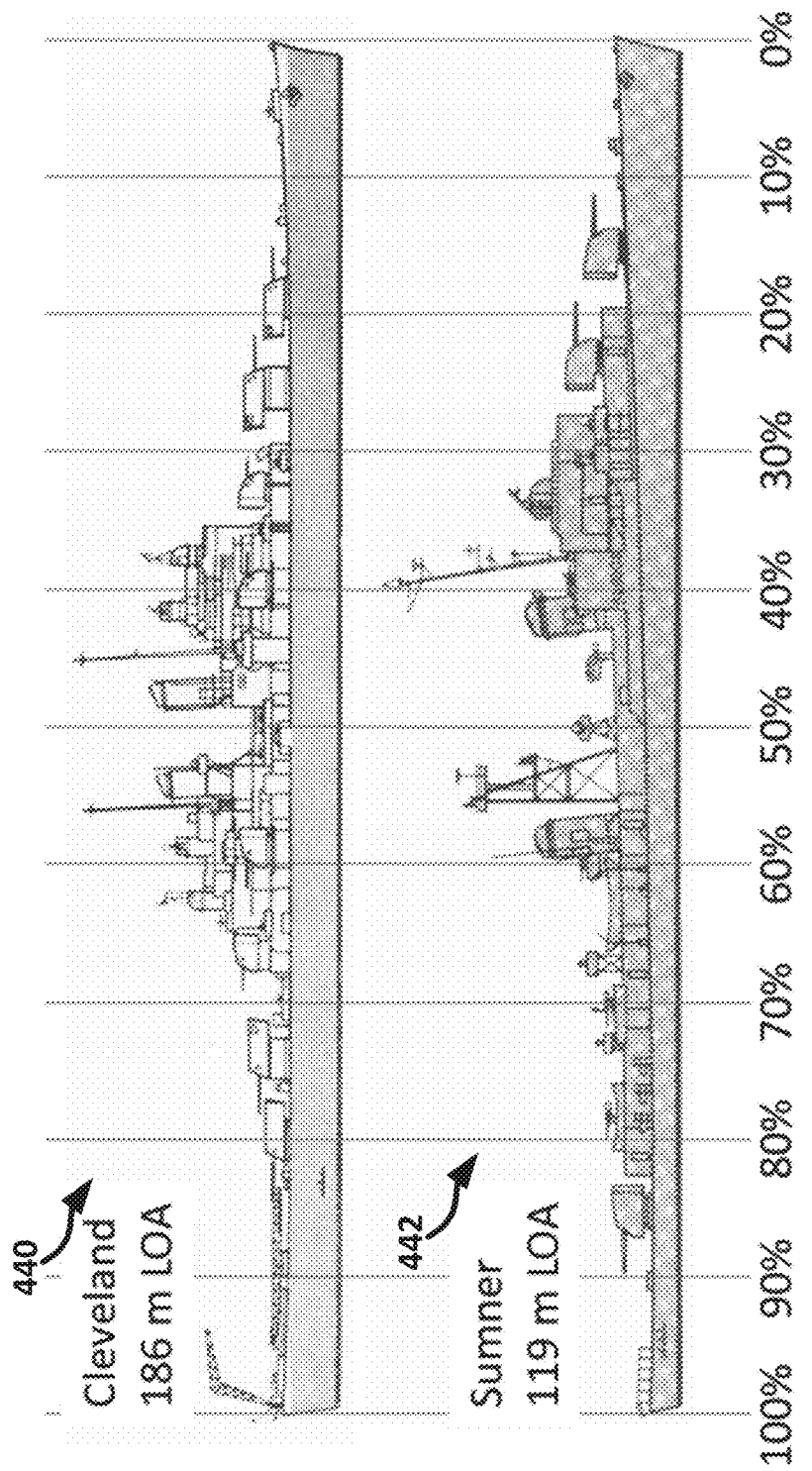
FIG. 4 illustrates, by way of example, drawings of two objects split into ten segments to aid in generating an object definition for inclusion in the object knowledge-base.

FIG. 4 illustrates, by way of example, drawings of two objects 440, 442 split into ten segments to aid in generating an object definition for inclusion in the object knowledge-base 330. A human analyst can generate a definition of the object 440, 442. The definition can include respective features and their location (e.g., beginning and end) relative to a length overall (LOA) axis of the object. The objects in the example of FIG. 4 are ships but could be a different object. The features of the ships can include super-structures (SS), stacks, masts, turrets, cranes, decks, forecastles, tanks, guns, missile launchers, communications structures, radomes, funnels, rescue ships, or the like. Some of the features can include sub-types. For example, a forecastle can be short or long, a deck can be a landing deck, cargo deck, container deck, tanker deck, stem deck, etc. The features can be associated with respective approximate beginning and end locations along the LOA of the object. Example object definitions are provided in Table 1 which include only an indication of the center of an object, but can include a length of the object, a beginning and end of the object relative to the LOA or the like.

TABLE 1

EXAMPLE OBJECT DEFINITIONS

| Cleveland | Sumner |
|---|---|
| LOA = 186 m | LOA = 119 m |
| SS 40%, 2 blocks | SS 60% |
| STACKS 47%, 55% | STACKS 43%, 58% |
| MASTS 45%, 56%, POLES | MASTS 37% POLE, 55% LATTICE |
| TURRETS 20%, 25%, 33%, 60%, 67%, 75%, AND 80% | TURRETS 15%, 24%, 85% |
| CRANE 100% | CRANE NONE |
| RADAR FLASH 38% | RADAR FLASH 55% |

While this description regards ISAR and provides distance relative to LOA axis (a distance in range), for other imagery systems, positions along LOA axis does not make sense or is not the most efficient choice. For example, in electro-optical (EO)/infrared (IR) imagery the coordinate system has 2 spatial elements X and Y (azimuth and elevation); likewise in radar data the dimensions are both spatial elements (range and azimuth). In these it can be more intuitive to use a two-dimensional (2D) mapping of feature positions instead of a one-dimensional (1D) mapping to an LOA axis as is suggested for use with ISAR herein.

The images 336 can be ISAR, SAR, EO/IR, multi-spectral, LADAR, SONAR, or the like. The images 336 can be of objects that are distinguishable based on feature presence relative to the LOA axis of the object. The images 336 can include labels that indicate the object present therein, such as a specific name of the object that is unique to the object, a class of the object, or the like.

At operation 338, the images 336 can be pre-processed. The operation can include image enhancement, segmenting object pixels (e.g., cropping in range), indicating a location (column of pixels) that includes the bow, indicating a location (column of pixels) that includes the stern, an angle of the ship major axis (axis that runs from the bow to the stern). The operation 338 can be performed automatically, such as based on metadata of a given image. The metadata can include information regarding the distance between the object and the sensor that generated the image, an orientation of the sensor, a location of the sensor, or the like.

The operation 340 can include auto-labeling object features based on a given image from the images 336 and an OFD from the OFD knowledge base 334. A class associated with the image can be used to retrieve the OFD for the object of the same class in the OFD knowledge base 334. The OFD knowledge base 334 can be queried based on the class to retrieve the OFD. The operation 340 can extract a segment of the image corresponding to a specified feature consistent with the OFD and label the segment according to the OFD. For example, if the OFD indicates that a 5 m turret is present with a center about 22 m from the bow, the operation 340 can produce a segment that includes a view of the 5 m region centered at about 22 m. The segment can be saved as an individual image and associated with a label corresponding to the feature in the labeled/extracted object features 342. The images in the labeled/extracted object features 342 can be used in training or testing a classifier that detects the feature. For ISAR images, the extracted segments including the feature can be fill-extent in Doppler and reduced in range.

Note that only a single OFD needs to be generated per object. Then, any number of images of the object of any image type (ISAR, SAR, EO/IR, multi-spectral, etc.) can be auto-labeled based on the OFD. This configuration greatly reduces the effort of labeling the images 336. Normally, manual labor is used to label each feature in each image of the images 336. For the system 300, however, a single OFD per object is generated to label and segment all images 336 of those objects features and each image includes only a label to identify the object individually, while features of the object need not be labelled.

Figure 5:
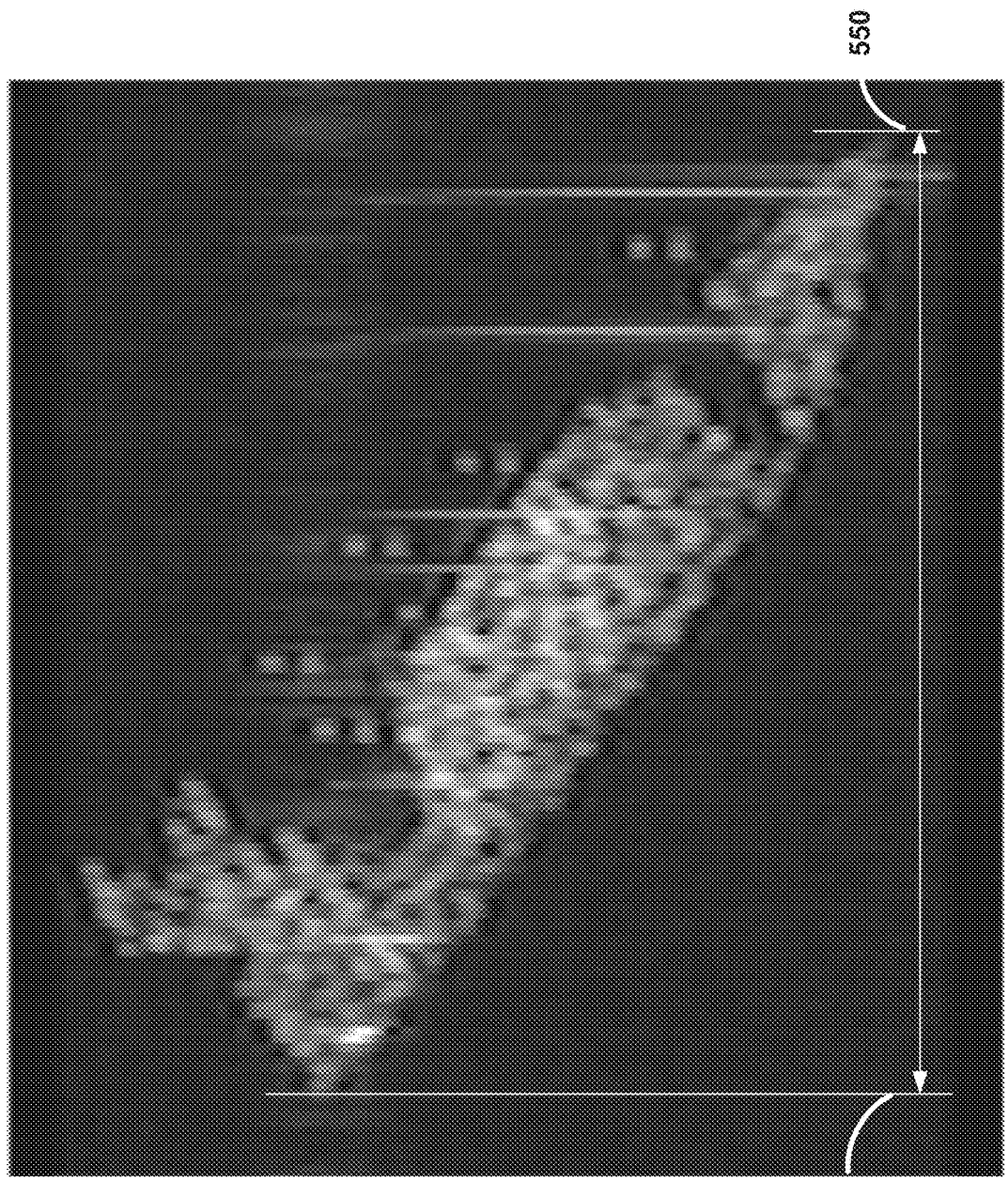
FIG. 5 illustrates, by way of example, an embodiment of an image for estimation of an LOA axis.
Figure 5:
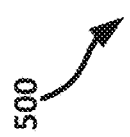

FIG. 5 illustrates, by way of example, an embodiment of an image for estimation of an LOA axis. In some instances, the operation 338 can include estimating the LOA axis of the object in the image based on measured characteristics of the object. The image of FIG. 5 is overlaid with lines 550 and 552 indicating a bow and stern, respectively. The LOA axis can be estimated based on an aspect angle of the image. In other instances where the target object has been tracked, the operation 338 may compute the aspect angle from track information and ownship information using conventional methods that are well known. The aspect angle information combined with the apparent length information gleaned from the image may be used to compute a true length. Based on the apparent length and aspect angle, the operation 338 can calculate a true length of the object. For example, if the apparent length is 86 meters and the aspect angle is 55 degrees, then the calculated true length of the object is 150 meters.

In some embodiments, the image segments (sometimes called chips) from the operation 340 can include additional information beyond the feature(s) shown in the segment. The additional information can include, for example, for each feature in the segment, an amount of the segment that the feature spans, an amount of the feature shown in the segment, or a combination thereof.

Figure 6:
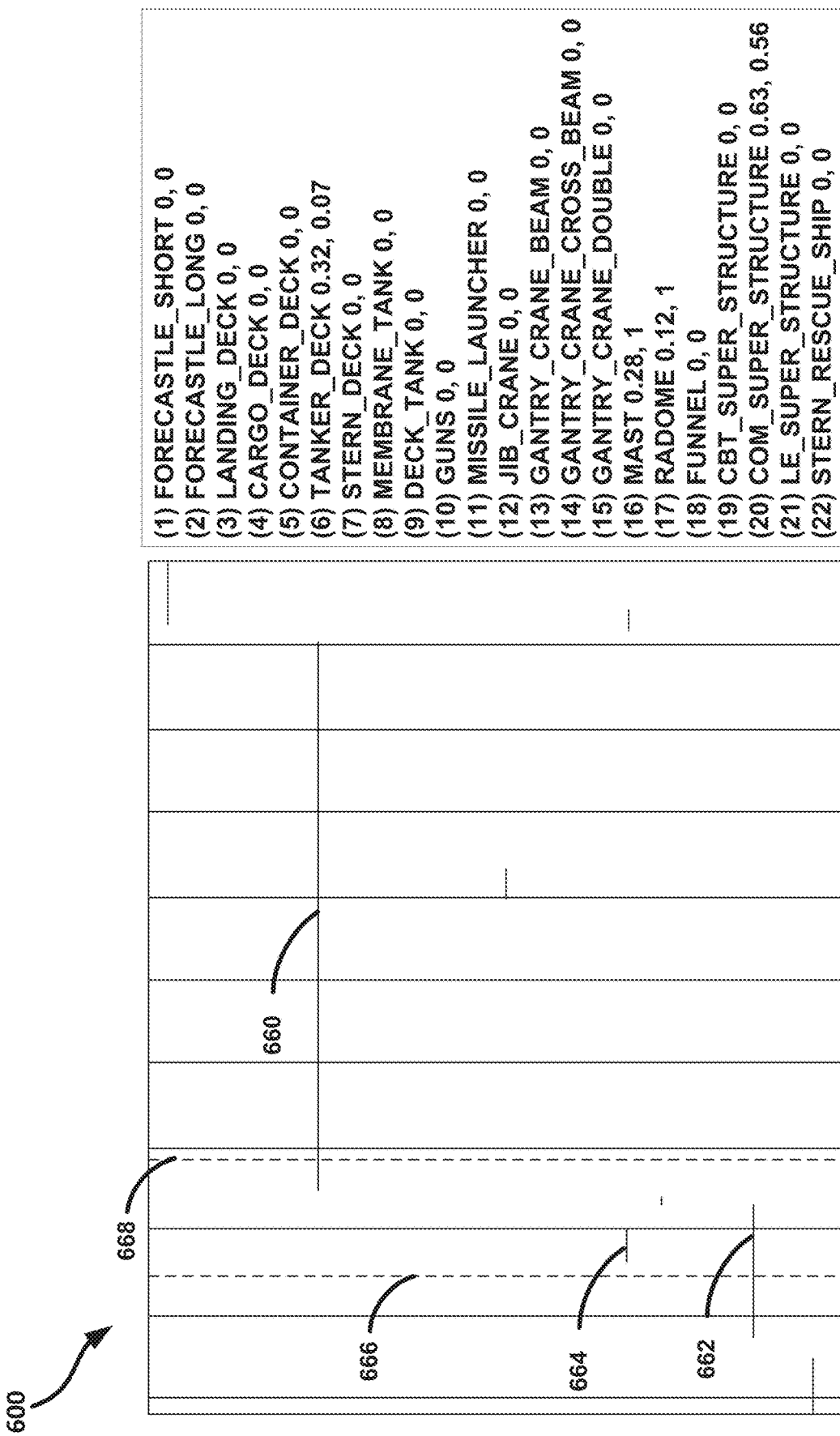
FIG. 6 illustrates, by way of example, a diagram of an embodiment of a feature grid that represents features of an object.

FIG. 6 illustrates, by way of example, a diagram of an embodiment of a feature grid 600 that represents features of an object. The feature grid 600 includes a grid with features represented by lines 660, 662, 664. The dashed lines 666, 668 indicate an extent of a given image segment within the image corresponding to the feature grid 600. The feature represented by the line 660 spans about 32% of the segment indicated by the dashed lines 666, 668. The segment indicated by the dashed lines 666, 668 includes about 7% of the feature represented by the line 660. The feature represented by the line 662 spans about 63% of the segment indicated by the dashed lines 666, 668. The segment indicated by the dashed lines 666, 668 includes about 56% of the feature represented by the line 662. The feature represented by the line 664 spans about 28% of the segment indicated by the dashed lines 666, 668. The segment indicated by the dashed lines 666, 668 includes 100% of the feature represented by the line 660. The labels for the segment indicated by the dashed lines 666, 668 can thus include labels (feature represented by line 660, 0.32, 0.07), (feature represented by line 662, 0.63, 0.56), (feature represented by line 664, 0.28, 1), etc. The additional information included with the feature identification in the label can be used to determine how to use the segment in training or testing a feature classifier or use the segment for another purpose.

Object feature detection is the identification and classification of object features in an image. An object feature detection system can include three processing steps including a region proposal, a region classification, and object feature identification (position and confidence generation). Embodiments of object feature detection provide a technique that generates a feature map, which identifies the presence and position of object features within an image of the object. This capability supports the capability of overall object classification via proportional feature displacement (PFD), and specifically allows for zero-shot/low-shot object classification in that object classification method (zero-shot/low-shot object classification is object classification with little or no collected data on the object type).

Embodiments of object feature detection provide an automatic feature recognition system and method pertaining to the identification and classification of object features in images. Embodiments can use an ensemble of pre-defined (trained) classifiers to perform detection of a plurality of features within an image of an object and builds feature profile maps describing the existence and position of features along an LOA axis of the object. The inputs to the ensemble of classifiers can be: (i) for classifier training and test, a database of labeled image chips. These extracted image chips can be estimated in range pixels and full-extent in Doppler. The image chips can be generated using the system 300 of FIG. 3. (ii) For inference, an image containing an object, an object boundary within that image, and a known image resolution.

The system and method is comprised of three major processing steps:

(i) Region proposal via a sliding window. (ii) Region classification via the ensemble of classifiers (called N-Feature Classifier). Each classifier classifies a single feature type and is individually tuned and trained for that feature type. (iii) Feature profile map generation (sometimes called object feature identification) via compilation of individual feature classifications into a feature profile mapping.

N-feature classifiers are convolved over the LOA axis of the object and divided into M-bins for use in proportional feature displacement (PFD)-based ship classification. The N-One-Class-At-A-Time classifiers use a plurality of (e.g., 32) tall-skinny kernels in first two Convolutional Neural Network (CNN) layers to extract features in the vertical (e.g., Doppler axis in ISAR imagery) along the LOA axis of the object.

Figure 7:
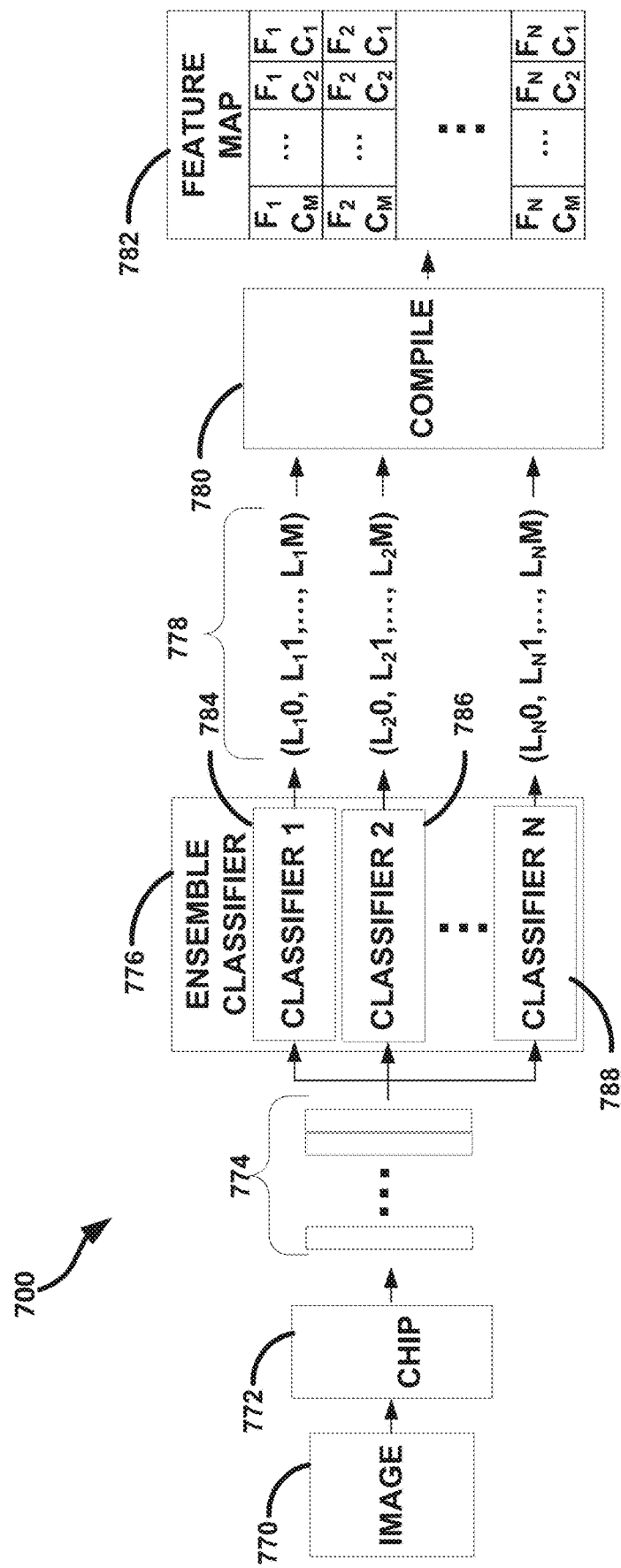
FIG. 7 illustrates, by way of example, a block diagram of an embodiment of a system for feature map generation.

FIG. 7 illustrates, by way of example, a block diagram of an embodiment of a system 700 for feature map generation. The system 700 as illustrated includes an image 770 as input and a feature map 782 as an output. The system 700 includes a chip operation 772 that provides image chips 774 as input to an ensemble classifier 776. Each classifier 784, 786, 788 of the ensemble classifier 776 generates likelihood vectors, jointly labeled as likelihood vectors 778 in FIG. 7. The likelihood vectors 778 are operated on by a compile operation 780 to generate the feature map 782. The feature map 782 indicates, for a given location along the LOA axis of the object in the image 770, a likelihood of each of the features classified by the ensemble classifier 776.

The image 770 can be from the images 336 or from a platform. The image chips 774 generated by the chip operation 772 can each be of a same or different extent column-wise or row-wise. If the image 770 is an ISAR image, the column-wise extent can be a full Doppler extent and the row-wise extent can be a proper subset of the range. The chips 774 can each provide a view of a proper subset of the image 770. The chips 774, when combined, can provide a view of the entire image 770. A sliding window can be moved across the image 770 to generate the image chips 774. The sliding window can generate image chips 774 that overlap a specified number of columns between immediately adjacent image chips. The overlap between immediately adjacent image chips 774 can be zero columns, up to the number of columns minus one.

The ensemble classifier 776 can implement classifiers 784, 786, 788 that are ML models. The classifiers 784, 786, 788 can each be trained to detect whether a different feature of the object is in the image 770. Considering the example object of a ship, the classifier 784 can be trained to detect a mast, the classifier 786 can be trained to detect a deck, and the classifier 788 can be trained to detect a turret, for example. Each of the classifiers of the ensemble classifier 776 can be trained using manually or automatically labelled images or image segments (sometimes called image chips). Generating labels for image segments automatically is discussed regarding FIG. 3 and elsewhere.

The image chips 774 may not be guaranteed to provide a view of an entire extent of a feature. If an image segment includes data indicating the amount of the segment that the feature spans in the image chip (in terms of number of columns spanned) is greater than a threshold amount (e.g., 10%, 20%, 30%, 33%, 35%, 40%, 50%, or an amount therebetween) or data indicating the amount of the feature shown in the segment (in terms of overall extent of the feature) is greater than a threshold amount (e.g., 25%, 30%, 33%, 40% 50%, 60%, 70%, 75%, 80%, 90%, 100%, or some amount therebetween) associated therewith, that image segment can be used for training or testing of the classifier 784, 786, 788. Training the classifier 784, 786, 788 in this manner can help the classifier 784, 786, 788 identify a feature that is not fully depicted in any of the image chips 774.

Each classifier 784, 786, 788 of the ensemble classifier 776 can produce a vector of likelihoods, jointly labelled as likelihoods 778 in FIG. 7. The likelihoods can indicate, for each feature and each image chip, a likelihood of that feature being present in the image chip. If there are M image chips and N features, there can be M×N likelihoods generated and provided to the compile operation 780.

The compile operation 780 can generate the feature map 782. The feature map 782 can indicate different extents of the LOA axis of the object in the image 770 along columns and different features along rows thereof. The feature map 782 can be formed of cells. Each cell of the cells can represent a location along the LOA axis and a feature of the features at that location along the LOA axis. An indicator can be provided in each of the cells that represents the corresponding likelihood that the feature is present at the location along the LOA. The indicator can include a color, shading, textual (e.g., with symbols, alpha-numeric characters, or the like) or other representation that represents the likelihood that the feature is present at the location along the LOA. The feature map 782 can then be provided to a classifier (see FIG. 8) for classifying the object based on the feature map 782.

Figure 8:
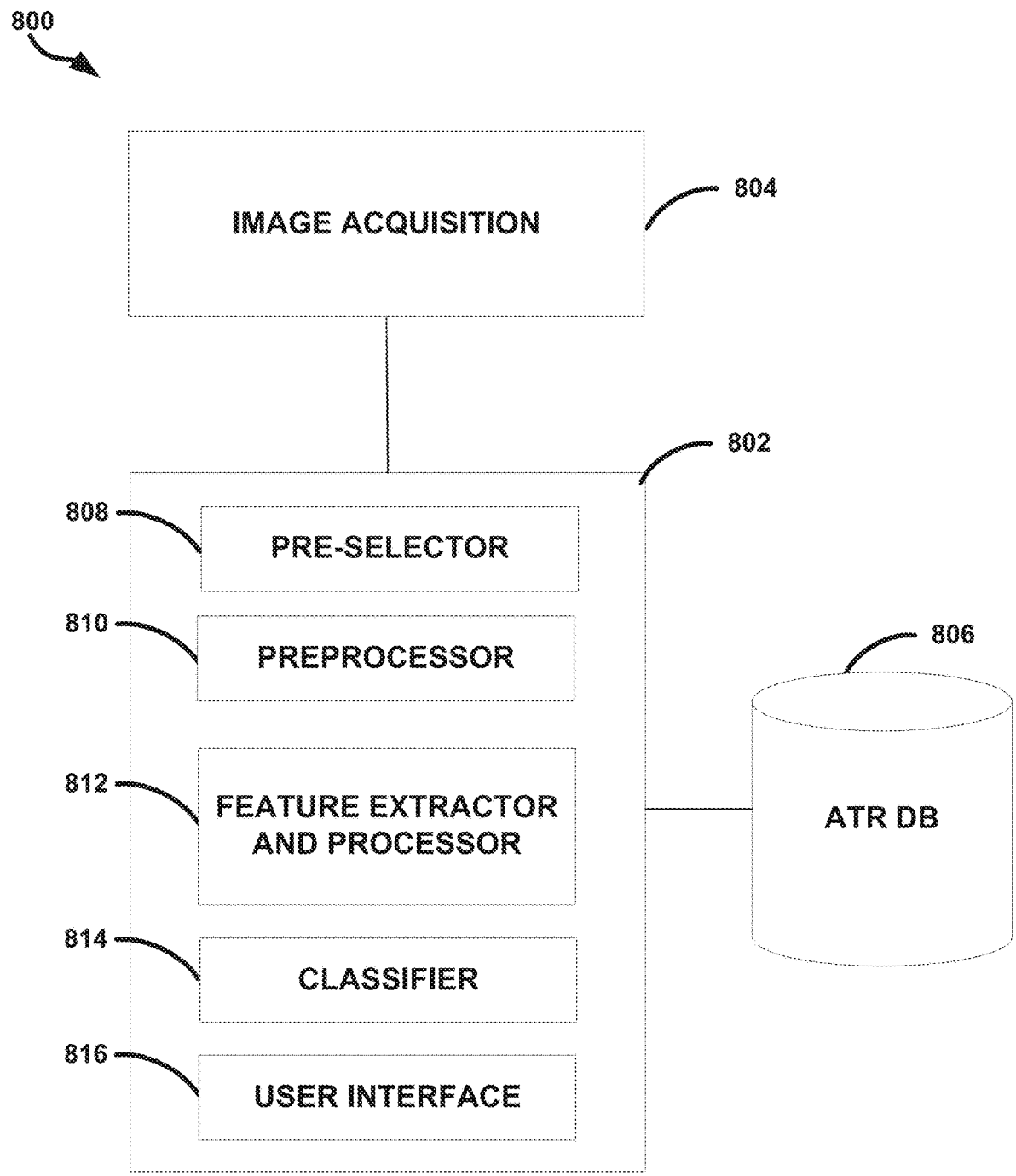
FIG. 8 illustrates, by way of example, a block diagram of an embodiment of an ATR system.

FIG. 8 illustrates, by way of example, a block diagram of an embodiment of an ATR system 800. The ATR system 800 as illustrated includes an image acquisition unit 804, and ATR server 802, a pre-selector 808, a preprocessor 810, feature extractor and processor 812, a classifier 814, a user interface 816, and an ATR database 806.

Image acquisition unit 804 may interface with and/or include a radar transceiver used to emit radar pulses and/or receive echoes from an illuminated target or terrain. Image acquisition unit 804 may use any of various spectrum estimation techniques to create image data associated with a target. Unit 804 may use fast Fourier transform imaging techniques including periodogram or matched filters, a Capon method, APES method, SAMV method, parametric subspace decomposition methods, MUSIC method, Overlapped Sub Aperture (OSA), autofocus, time-domain back projection, and/or frequency-domain back projection among other known techniques. Image acquisition unit 804 may use variation reduction techniques depending on whether a SAR or ISAR is used to acquire target data (e.g., an image). Unit 804 may use techniques such as image energy normalization and/or pose rectification in radio frequency (RF) signal processing and image formation. Unit 804 may apply a polar mapping method for ISAR images. Image acquisition unit 804 may use various techniques to process raw radar target data to form a human perceivable image of an illuminated target, such as vessel 106 or another object.

Alternatively, image acquisition unit 804 may process received radar data into a non-perceivable form that is then further processed by, for example, preprocessor 810 to realize a human perceivable image. Image acquisition unit 804 may process images and/or image data based on, without limitation, synthetic aperture radar (SAR), inverse synthetic aperture radar (ISAR), laser detection and ranging (LADAR), infrared detection, electro-optical (EO)/infrared (IR) (optical based imagery), and/or hyperspectral radar data.

Preprocessor 810 may perform some or all of the operations described with respect to image acquisition unit 804. Preprocessor 810 may perform additional processor techniques to further enhance an image, such as the pre-process operation 338. In some implementations, preprocessor 810 estimates the length of the object in the image based on measured characteristics of the image as discussed elsewhere.

Preprocessor 810 may estimate any one or more characteristics of the object, such as, without limitation, length, height, width, shape, or kinematics. Preprocessor 810 may perform one or more quality checks of image 800 to determine if the image is of sufficient quality to perform a target recognition analysis.

Pre-selector 808 may receive a designation of an object type from an operator via user interface 816. In certain implementations, pre-selector 808 retrieves a portion or subset of target recognition data in database 806 based on the object type. The object type may include a fundamental characteristic of a class of target such as, without limitation, target LOA axis, target width, target height, target state, target kinematics, target shape, target location, and/or mission context. Target state refers to intrinsically sensed characteristics, such as maneuvering, the presence or absence of fuel barrels, torpedoes, articulation of gantry cranes, jib cranes, masts, guns, and open or closed hatches.

ATR database 806 may store target recognition data, such as that stored in object knowledge-base 330 or OFD knowledge-base 334. The ATR database 806 can include multiple reference features associated with each of multiple reference targets (e.g., object names or identifications that uniquely identify the object).

Feature extractor and processor 812 may perform the operation 340. The feature extractor and processor 812 may be configured to compare and/or discriminate features of the object in a preprocessed image. The feature extractor and processor 812 can perform the chip operation 772, implement the ensemble classifier 776, perform the operation 780, or a combination thereof.

Classifier 814 may be configured to classify an object based on the feature map 782. Classifier 814 can include multiple decision trees that solve the classification problem. The classifier 814 may use Bayesian networks or directed acyclic graphs (DAG). Classifier 814 may select the decision tree having the minimal misclassification cost and determine a classification of the acquired target based on the feature map 782. Classifier 814 may generate a classification decision report based on the determined classification of the acquired target in the image. Classifier 814 may use one or more neural networks, such multilayer perceptrons (MLPs), convolutional neural networks (CNNs), or deep Boltzmann machines (DBM) that are trained to compute a function that maps the feature map 782 to an output vector. The output vector may convey estimates of likelihoods of target classes (objects). In some implementations, classifier 814 uses a recurrent neural network (RNN) where its neurons send feedback signals to each other to enable dynamic temporal behavior, such as determining whether a given image chip includes a feature based on one or more past image chips and the given image chip. Classifier 814 may use an enhanced RNN referred to as long short-term memory (LSTM) and/or hierarchal temporal memory (HTM). Classifier 814 may use fuzzy logic. Classifier 814 may combine multiple aforementioned algorithms to form a hybrid system. A decision tree is a generic term that describes a decision process that may use one or more attributes at each node and/or use an information theoretic measure to formulate queries at each node. It does not refer to a specific implementation, but may include one or a combination of ID3, C4.5, and/or CART.

User interface 816 may be arranged to display the classification decision report to an operator. The classification decision report may include a graphical explanation of the determined classification of the acquired target. The classification report may include a graphical representation of the decision tree having the minimal misclassification cost as illustrated in decision tree. The classification report may include the extracted features (e.g., from image chips 774) or machine representations of those features, such as the activation values of an NN hidden layer forming a mapping or manifold. In some implementations, classifier 814 fuses a portion of reference features of the multiple reference features in database 806 to provide confidence metrics associated with a determined classification of an acquired target in the image.

As explained elsewhere, embodiments are illustrated and described generally using ships as example objects that include features disposed along a length of the ship. Other objects include features disposed along the length thereof. Some example objects and corresponding features include an airplane with features of engine (sub-features jet, prop, turbofan, or the like), fuselage, identification, insignia, rudder, tail, windows, wings, among others; antenna with features of aerial, articulated, dish, rotating, tower, among others; building with features of bunker, columns, doors (sub-features of double, single, rolling), mouldings, roof (sub-features of flat, pitched), window, among others; convoy with features car, dismounts, end vehicle, lead vehicle, truck, tank, among others; foliage with features bushes, grass, shrubs, trees (sub-features of branch, conifer, deciduous, fruit, limb, trunk), among others; gatherings with features assembly, formation, parade, pedestrians (sub-features of cueing, marching, milling, random, tight, walking), sidewalk, sporting, among others; installations with features of artillery, barracks, command, platoon, surface-to-air missile (SAM) (sub-features of command, launcher, radar), among others; land mass with features of bay, continent, littoral, mountain, island, jetty, man-made, among others; space systems with features of launch vehicle, nozzle, satellite (sub-features of communication, E/O, weather), solar panels, among others; unmanned aerial vehicle (UAV) with features of airplane, drone, helicopter, hybrid, multi-rotor, quad, among others; and vehicles with features of antenna, bed, body, cab, engine compartment, fuel container, skirt, turret, wheel, among others. This list of objects (or collections of objects) is not exhaustive and other objects with features that vary in location along the length thereof are applicable to embodiments.

Figure 9:
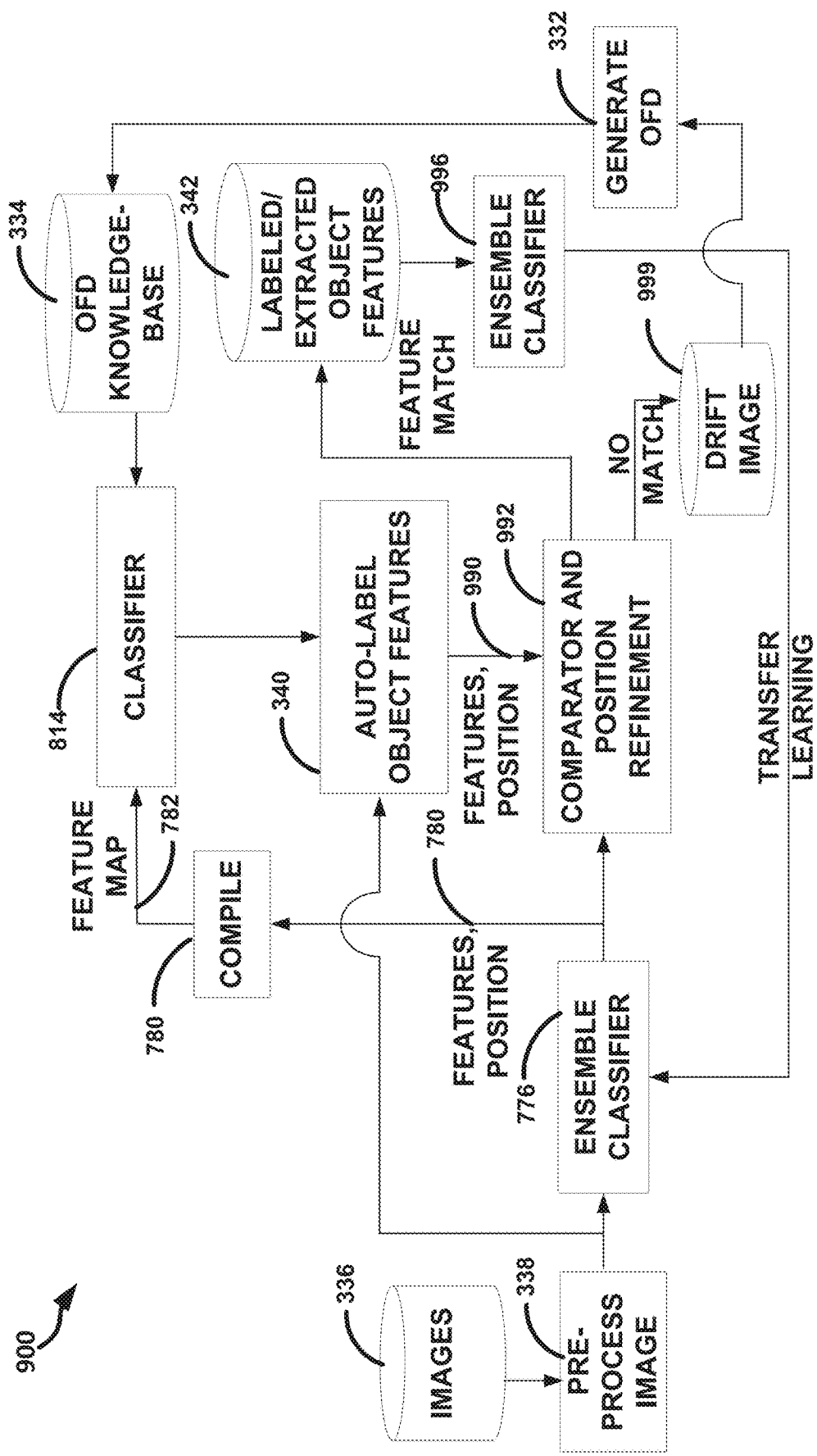
FIG. 9 illustrates, by way of example, a block diagram of an embodiment of a system for ML model drift detection and ML model updating.

FIG. 9 illustrates, by way of example, a block diagram of an embodiment of a system 900 for ML model drift detection and ML model updating. The system 900 includes some components described elsewhere and illustrated in at least one of FIGS. 3, 7, and 8 including images database 336, operation 338, ensemble classifier 776, compile operation 780, classifier 814, auto-label object features operation 340, OFD knowledge-base 334, labeled/extracted object features database 342, and generate OFD operation 332.

An image of the images 336 is provided to the pre-process image operation 338. A pre-processed version of the image from the operation 338 is provided to the ensemble classifier 776 and the auto-label object features operation 340. Both of the auto-label object features operation 340 and the ensemble classifier 776 provide data indicating features and respective positions of the features 780, 990.

The classifier 814 can operate using, as input, the feature map 782 compiled at operation 780. The classifier 814 can identify the object in the image. The OFD corresponding to that object can be provided to the auto-label object features operation 340.

A comparator and position refinement operation 992 can compare the features, position 990 and the features, position 780. If the features, position 990 and 780 match (include the same features and the corresponding positions are within a threshold percentage of each other (e.g., 1%, 5%, 10%, 15%, 20%, 25%, or a percentage therebetween)) the features, position 990, 780, or a mathematical combination thereof, can be stored in the labeled/extracted object features database 342 in place of a previous entry for the features/position in the database 342.

If there is no match (e.g., if there is a feature that was not accounted for in the OFD knowledgebase 334 for the object or positions of features between features, position 780 and 990 are not within a specified threshold percentage of each other) the image can be stored in a drift image database 999. The drift image represents a component for which the OFD knowledgebase 334 has insufficient information or the ensemble classifier 776 is not sufficiently trained to classify. The generate OFD operation 332 can be performed based on the image.

Another instantiation of the ensemble classifier 776 can be implemented as ensemble classifier 996. The ensemble classifier 996 can be further trained based on test images provided to the ensemble classifier 776. Transfer learning between the ensemble classifier 996 and the ensemble classifier 776 can be performed to update the ensemble classifier 776 and negate detected model drift.

Figure 10:
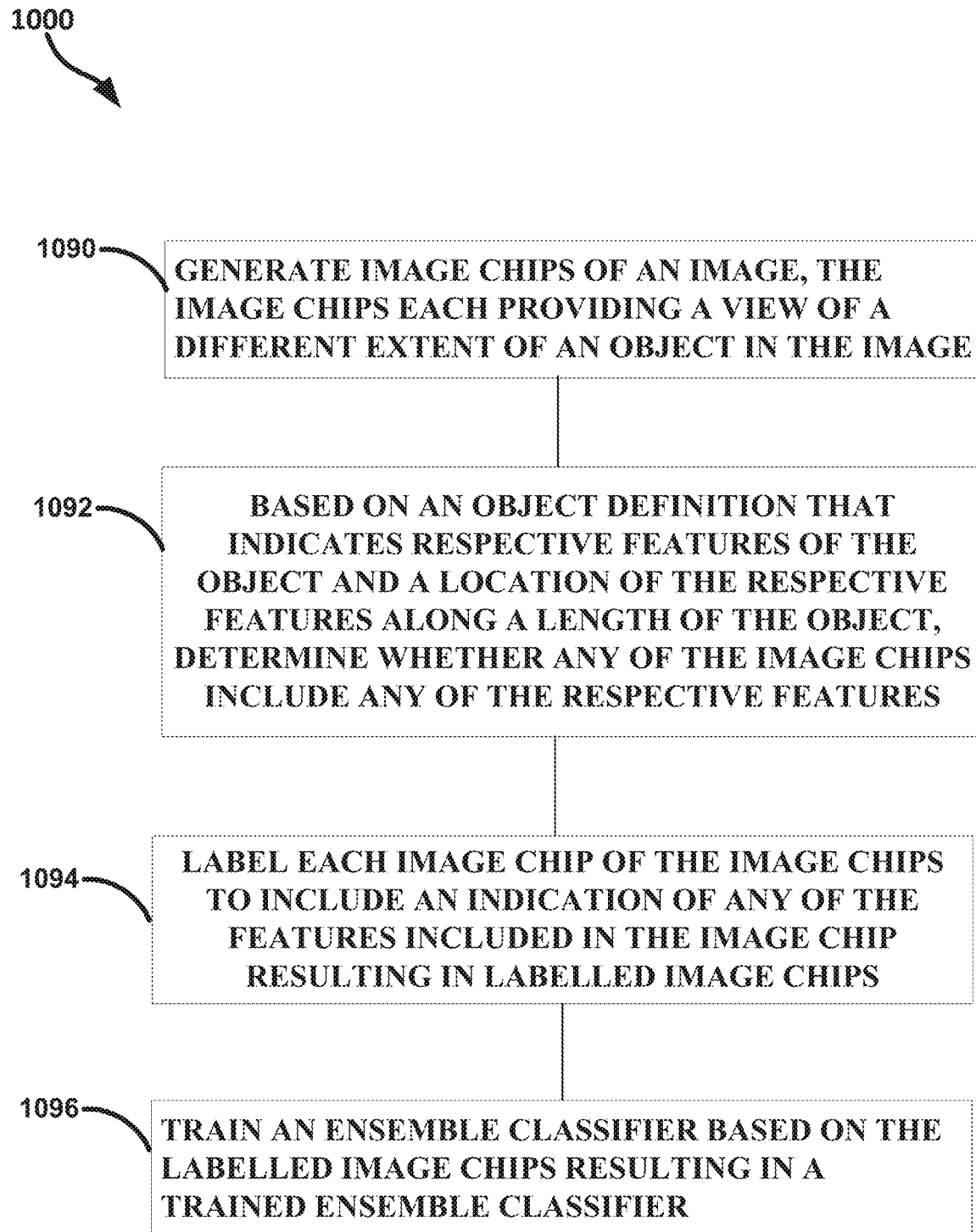
FIG. 10 illustrates, by way of example, a block diagram of an embodiment of a method for ML model operation.

FIG. 10 illustrates, by way of example, a block diagram of an embodiment of a method 1000 for ML model generation. The method 1000 as illustrated includes generating image chips of an image, the image chips each providing a view of a different extent of an object in the image, at operation 1090; based on an object definition that indicates respective features of the object and a location of the respective features along a length of the object, determining whether any of the image chips include any of the respective features, at operation 1092; label each image chip of the image chips to include an indication of any of the features included in the image chip resulting in labelled image chips, at operation 1094; and training an ensemble classifier based on the labelled image chips resulting in a trained ensemble classifier, at operation 1096.

The operation 1094 can include associating an indication of a column-wise extent of the feature in the image chip with the image. The operation 1098 can include training a classifier of the ensemble classifier using the image chip only if the column-wise extent is greater than a specified threshold. The operation 1094 can further include associating an indication of an amount of the feature in the image chip with the image chip. The image chips can be inverse synthetic aperture radar (ISAR) image chips that are full extent in Doppler of the image and a proper subset of a range of the image.

The method 1000 can further include receiving a second image. The method 1000 can further include generating image chips of the second image. The method 1000 can further include operating each of N-classifiers of the trained ensemble classifier on each of the image chips providing an indication of whether each of N features are present in each of the image chips. The method 1000 can further include generating, based on the indication of whether each of the N features are present in each of the image chips, a feature map indicating a length of the object along rows and features along columns, with entries in the feature map indicating a likelihood of a corresponding feature is at a corresponding length. The method 900 can further include operating an ML model trained based on training feature maps, on the feature map to classify the object in the image. The training feature maps are feature maps, similar to the feature map 782, generated before deployment of the ML model and used for training the ML model. Another feature map 782, generated by the system 700 can be used by the ML model for classification. The method 900 can include detecting model drift of the trained ensemble classifier based on a comparison of (1) features and corresponding positions along the length produced by the ensemble classifier and (2) features and corresponding positions along the length from the object definition.

AI is a field concerned with developing decision-making systems to perform cognitive tasks that have traditionally required a living actor, such as a person. NNs are computational structures that are loosely modeled on biological neurons. Generally, NNs encode information (e.g., data or decision making) via weighted connections (e.g., synapses) between nodes (e.g., neurons). Modern NNs are foundational to many AI applications, such as speech recognition.

Many NNs are represented as matrices of weights that correspond to the modeled connections. NNs operate by accepting data into a set of input neurons that often have many outgoing connections to other neurons. At each traversal between neurons, the corresponding weight modifies the input and is passed to an activation function. The result of the activation function is then transmitted to another neuron further down the NN graph. The process of weighting and processing, via activation functions, continues until an output neuron is reached; the pattern and values of the output neurons constituting the result of the ANN processing.

The correct operation of most NNs relies on accurate weights. However, NN designers do not generally know which weights will work for a given application. NN designers typically choose a number of neuron layers or specific connections between layers including circular connections. A training process may be used to determine appropriate weights by selecting initial weights. In some examples, the initial weights may be randomly selected. Training data is fed into the NN and results are compared to an objective function that provides an indication of error. The error indication is a measure of how wrong the NN's result is compared to an expected result. This error is then used to correct the weights. Over many iterations, the weights will collectively converge to encode the operational data into the NN. This process may be called an optimization of the objective function (e.g., a cost or loss function), whereby the cost or loss is minimized.

Gradient descent is a common technique for optimizing a given objective (or loss) function. The gradient (e.g., a vector of partial derivatives) of a scalar field gives the direction of steepest increase of this objective function. Therefore, adjusting the parameters in the opposite direction by a small amount decreases the objective function. After performing a sufficient number of iterations, the parameters will tend towards a minimum value. In some implementations, the learning rate (e.g., step size) is fixed for all iterations. However, small step sizes tend to take a long time to converge, whereas large step sizes may oscillate around a minimum value or exhibit other undesirable behavior. Variable step sizes are usually introduced to provide faster convergence without the downsides of large step sizes.

After a forward pass of input data through the neural network, backpropagation provides an economical approach to evaluate the gradient of the objective function with respect to the network parameters. The final output of the network is built from compositions of operations from each layer, which necessitates the chain rule to calculate the gradient of the objective function. Backpropagation exploits the recursive relationship between the derivative of the objective with respect to a layer output and the corresponding quantity from the layer in front of it, starting from the final layer backwards towards the input layer. This recursive relationship eliminates the redundancy of evaluating the entire chain rule for the derivative of the objective with respect to each parameter. Any well-known optimization algorithm for backpropagation may be used, such as stochastic gradient descent (SGD), Adam, etc.

Figure 11:
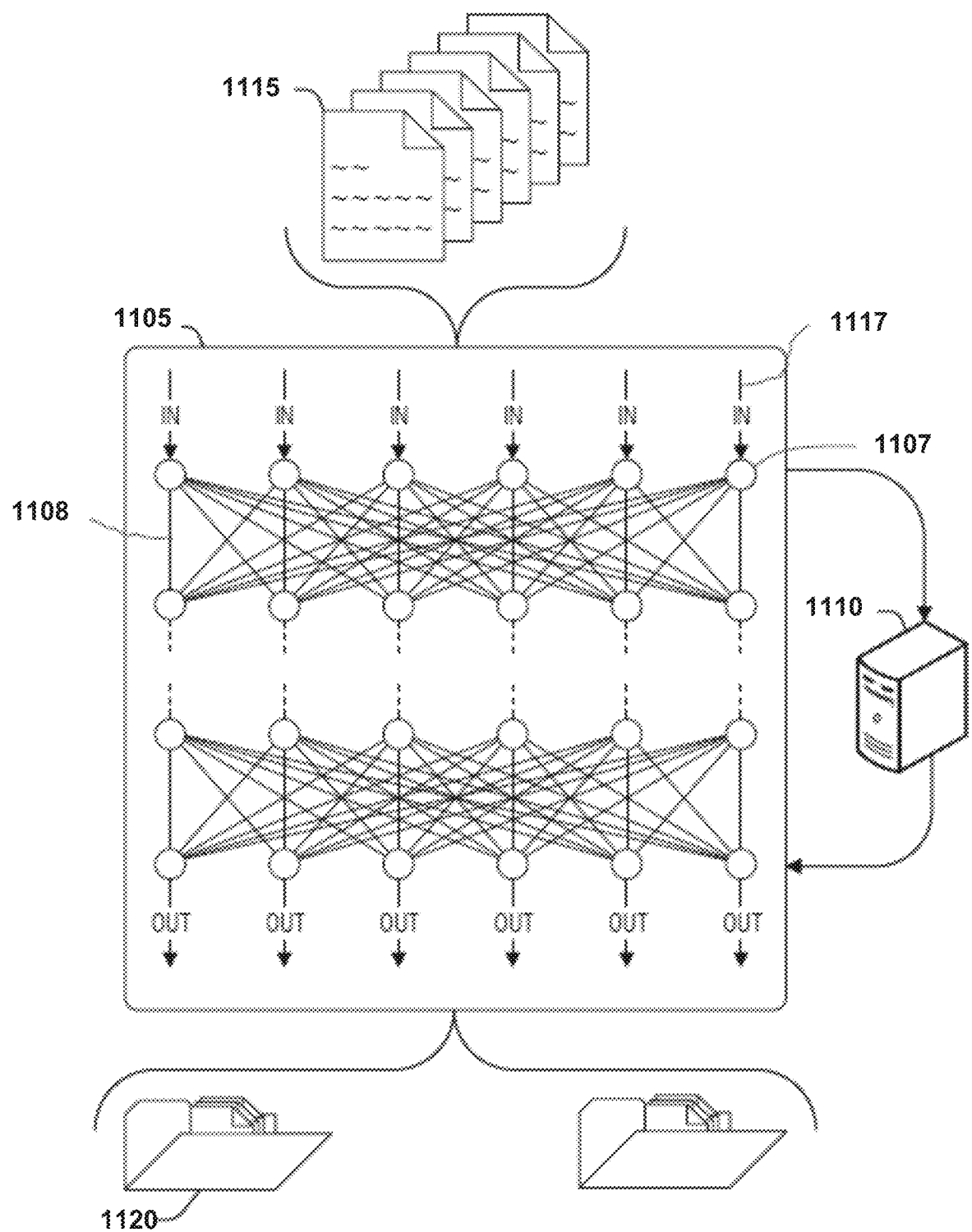
FIG. 11 is a block diagram of an example of an environment including a system for NN training, according to an embodiment.

FIG. 11 is a block diagram of an example of an environment including a system for NN training, according to an embodiment. The system can aid in ATR, ML model training, ML model input generation, or the like according to one or more embodiments. The system includes an artificial NN (ANN) 1105 that is trained using a processing node 1110. The processing node 1110 may be a central processing unit (CPU), graphics processing unit (GPU), field programmable gate array (FPGA), digital signal processor (DSP), application specific integrated circuit (ASIC), or other processing circuitry. In an example, multiple processing nodes may be employed to train different layers of the ANN 1105, or even different nodes 1107 within layers. Thus, a set of processing nodes 1110 is arranged to perform the training of the ANN 1105.

The set of processing nodes 1110 is arranged to receive a training set 1115 for the ANN 1105. The ANN 1105 comprises a set of nodes 1107 arranged in layers (illustrated as rows of nodes 1107) and a set of inter-node weights 1108 (e.g., parameters) between nodes in the set of nodes. In an example, the training set 1115 is a subset of a complete training set. Here, the subset may enable processing nodes with limited storage resources to participate in training the ANN 1105.

The training data may include multiple numerical values representative of a domain, such as images, or the like. Each value of the training or input 1117 to be classified once ANN 1105 is trained, is provided to a corresponding node 1107 in the first layer or input layer of ANN 1105. The values propagate through the layers and are changed by the objective function.

As noted above, the set of processing nodes is arranged to train the neural network to create a trained neural network. Once trained, data input into the ANN will produce valid classifications 1120 (e.g., the input data 1117 will be assigned into categories), for example. The training performed by the set of processing nodes 1107 is iterative. In an example, each iteration of the training the neural network is performed independently between layers of the ANN 1105. Thus, two distinct layers may be processed in parallel by different members of the set of processing nodes. In an example, different layers of the ANN 1105 are trained on different hardware. The members of different members of the set of processing nodes may be located in different packages, housings, computers, cloud-based resources, etc. In an example, each iteration of the training is performed independently between nodes in the set of nodes. This example is an additional parallelization whereby individual nodes 1107 (e.g., neurons) are trained independently. In an example, the nodes are trained on different hardware.

Figure 12:
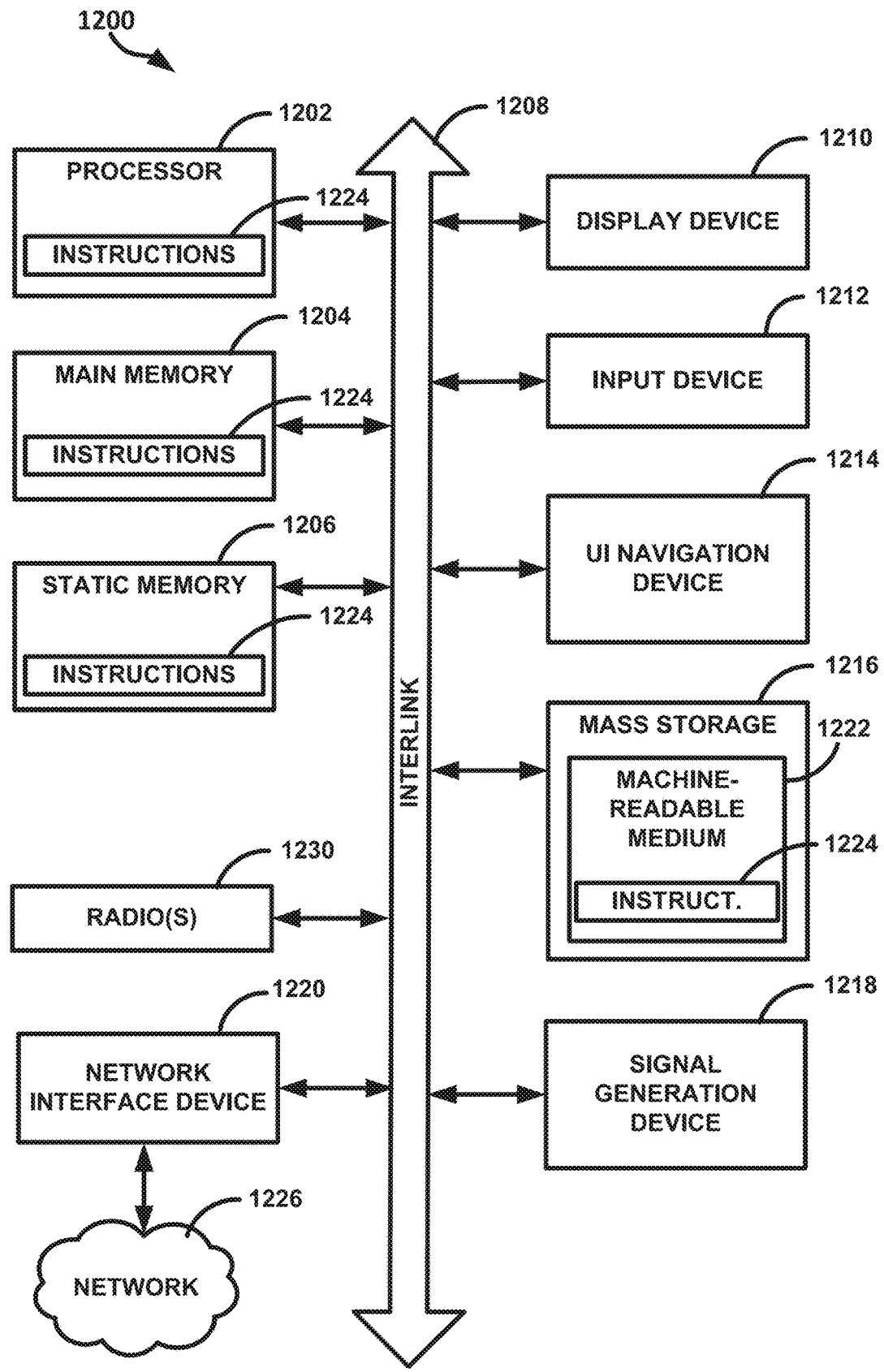
FIG. 12 illustrates, by way of example, a block diagram of an embodiment of a machine in the example form of a computer system within which instructions, for causing the machine to perform any one or more of the methodologies discussed herein, may be executed.

FIG. 12 illustrates, by way of example, a block diagram of an embodiment of a machine in the example form of a computer system 1200 within which instructions, for causing the machine to perform any one or more of the methodologies discussed herein, may be executed. One or more of the operation 332, operation 338, operation 340, operation 772, ensemble classifier 776, classifier 784, 786, 788, operation 780, unit 804, pre-selector 808, preprocessor 810, feature extractor and processor 812, classifier 814, user interface 816, comparator and position refinement operation 992, ensemble classifier 996, method 1000, or other device, component, operation, or method discussed can include, or be implemented or performed by one or more of the components of the computer system 1200. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a user interface (UI) navigation device 1214 (e.g., a mouse), a mass storage unit 1216, a signal generation device 1218 (e.g., a speaker), a network interface device 1220, and a radio 1230 such as Bluetooth, WWAN, WLAN, and NFC, permitting the application of security controls on such protocols.

The mass storage unit 1216 includes a machine-readable medium 1222 on which is stored one or more sets of instructions and data structures (e.g., software) 1224 embodying or utilized by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media.

While the machine-readable medium 1222 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding, or carrying instructions for execution by the machine and that cause the machine to perform any one or more of the methodologies of the present invention, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices, magnetic disks such as internal hard disks and removable disks; magneto-optical disks; and CD-ROM and DVD-ROM disks.

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible media to facilitate communication of such software.

ADDITIONAL NOTES AND EXAMPLES

Example 1 includes a method for machine learning (ML) model generation comprising generating image chips of an image, the image chips each providing a view of a different extent of an object in the image, based on an object definition that indicates respective features of the object and a location of the respective features along a length of the object, determining whether any of the image chips include any of the respective features, labeling each image chip of the image chips to include an indication of any of the features included in the image chip resulting in labelled image chips, and training an ensemble classifier based on the labelled image chips resulting in a trained ensemble classifier.

In Example 2, Example 1 can further include, wherein labelling each image chip further includes an indication of a column-wise extent of the feature in the image chip.

In Example 3, Example 2 can further include, wherein training the ensemble classifier includes training a classifier of the ensemble classifier using the image chip only if the column-wise extent is greater than a specified threshold.

In Example 4, at least one of Examples 1-3 can further include, wherein labelling each image chip further includes an indication of an amount of the feature in the image chip.

In Example 5, at least one of Examples 1-4 can further include, wherein the image chips are inverse synthetic aperture radar (ISAR) image chips that are full extent in Doppler of the image and a proper subset of a range of the image.

In Example 6, at least one of Examples 1-5 can further include receiving a second image, generating image chips of the second image, operating each of N-classifiers of the trained ensemble classifier on each of the image chips providing an indication of whether each of N features are present in each of the image chips, and generating, based on the indication of whether each of the N features are present in each of the image chips, a feature map indicating a length of the object along rows and features along columns, with entries in the feature map indicating a likelihood of a corresponding feature is at a corresponding length.

In Example 7, Example 6 can further include detecting model drift of the trained ensemble classifier based on a comparison of (1) features and corresponding positions along the length produced by the ensemble classifier and (2) features and corresponding positions along the length from the object definition.

Example 8 includes a non-transitory machine-readable medium including instructions that, when executed by a machine, cause the machine to perform operations for machine learning (ML) model generation, the operations comprising the method of one of Examples 1-7.

Example 15 includes a device comprising a memory device including instructions stored thereon and processing circuitry coupled to the memory device, the processing circuitry configured to execute the instructions, the instructions, when executed by the processing circuitry cause the processing circuitry to perform operations for machine learning (ML) model generation, the operations comprising the method of one of Examples 1-7.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method for machine learning (ML) model generation comprising:
  generating image chips of an image, the image chips each providing a view of a different extent of an object in the image;
  based on an object definition that indicates respective features of the object and a location of the respective features along a length of the object, determining whether any of the image chips include any of the respective features;

labeling each image chip of the image chips to include an indication of any of the respective features included in the image chip resulting in labelled image chips;

training an ensemble classifier based on the labelled image chips resulting in a trained ensemble classifier;

receiving a second image;

generating image chips of the second image resulting in second image chips;

operating each of N-classifiers of the trained ensemble classifier on each of the second image chips providing an indication of whether each of N features of the respective features are present in each of the second image chips; and generating, based on the indication of whether each of the N features are present in each of the second image chips, a feature map indicating a length of the object along rows and features along columns, with entries in the feature map indicating a likelihood of a corresponding feature is at a corresponding length.

2. The method of claim 1, wherein labelling each image chip further includes an indication of a column-wise extent of the respective features in the image chip.

3. The method of claim 2, wherein training the ensemble classifier includes training a classifier of the ensemble classifier using the image chip only if the column-wise extent is greater than a specified threshold.

4. The method of claim 1, wherein labelling each image chip further includes an indication of an amount of the respective features in the image chip.

5. The method of claim 1, wherein the image chips are inverse synthetic aperture radar (ISAR) image chips that are full extent in Doppler of the image and a proper subset of a range of the image.

6. The method of claim 1, further comprising detecting model drift of the trained ensemble classifier based on a comparison of (1) features and corresponding positions along the length produced by the ensemble classifier and (2) features and corresponding positions along the length from the object definition.

7. A non-transitory machine-readable medium including instructions that, when executed by a machine, cause the machine to perform operations for machine learning (ML) model generation, the operations comprising:

generating image chips of an image, the image chips each providing a view of a different extent of an object in the image;

based on an object definition that indicates respective features of the object and a location of the respective features along a length of the object, determining whether any of the image chips include any of the respective features;

labeling each image chip of the image chips to include an indication of any of the respective features included in the image chip resulting in labelled image chips;

training an ensemble classifier based on the labelled image chips resulting in a trained ensemble classifier;

receiving a second image;

generating image chips of the second image resulting in second image chips;

operating each of N-classifiers of the trained ensemble classifier on each of the second image chips providing an indication of whether each of N features are present in each of the second image chips; and generating, based on the indication of whether each of the N features are present in each of the second image chips, a feature map indicating a length of the object along rows and features along columns, with entries in the feature map indicating a likelihood of a corresponding feature is at a corresponding length.

8. The non-transitory machine-readable medium of claim 7, wherein labelling each image chip further includes an indication of a column-wise extent of the respective features in the image chip.

9. The non-transitory machine-readable medium of claim 8, wherein training the ensemble classifier includes training a classifier of the ensemble classifier using the image chip only if the column-wise extent is greater than a specified threshold.

10. The non-transitory machine-readable medium of claim 7, wherein labelling each image chip further includes an indication of an amount of the respective features in the image chip.

11. The non-transitory machine-readable medium of claim 7, wherein the image chips are inverse synthetic aperture radar (ISAR) image chips that are full extent in Doppler of the image and a proper subset of a range of the image.

12. The non-transitory machine-readable medium of claim 7, wherein the operations further comprise detecting model drift of the trained ensemble classifier based on a comparison of (1) features and corresponding positions along the length produced by the ensemble classifier and (2) features and corresponding positions along the length from the object definition.

13. A device comprising:

a memory device including instructions stored thereon; and processing circuitry coupled to the memory device, the processing circuitry configured to execute the instructions, the instructions, when executed by the processing circuitry cause the processing circuitry to perform operations for machine learning (ML) model generation, the operations comprising:

generating image chips of an image, the image chips each providing a view of a different extent of an object in the image;

based on an object definition that indicates respective features of the object and a location of the respective features along a length of the object, determining whether any of the image chips include any of the respective features;

labeling each image chip of the image chips to include an indication of any of the respective features included in the image chip resulting in labelled image chips;

training an ensemble classifier based on the labelled image chips resulting in a trained ensemble classifier;

receiving a second image;

generating image chips of the second image resulting in second image chips;

operating each of N-classifiers of the trained ensemble classifier on each of the second image chips providing an indication of whether each of N features are present in each of the second image chips; and generating, based on the indication of whether each of the N features are present in each of the second image chips, a feature map indicating a length of the object along rows and features along columns, with entries in the feature map indicating a likelihood of a corresponding feature is at a corresponding length.

14. The device of claim 13, wherein labelling each image chip further includes an indication of a column-wise extent of the respective features in the image chip.

15. The device of claim 14, wherein training the ensemble classifier includes training a classifier of the ensemble classifier using the image chip only if the column-wise extent is greater than a specified threshold.

16. The device of claim 13, wherein labelling each image chip further includes an indication of an amount of the respective features in the image chip.

17. The device of claim 13, wherein the image chips are inverse synthetic aperture radar (ISAR) image chips that are full extent in Doppler of the image and a proper subset of a range of the image.

* * * * *